No. 690,503. Patented Jan. 7, 1902.
H. H. WING.
PROCESS OF MAKING MAGNESIUM SULFITE.
(Application filed May 13, 1901.)
(No Model.)
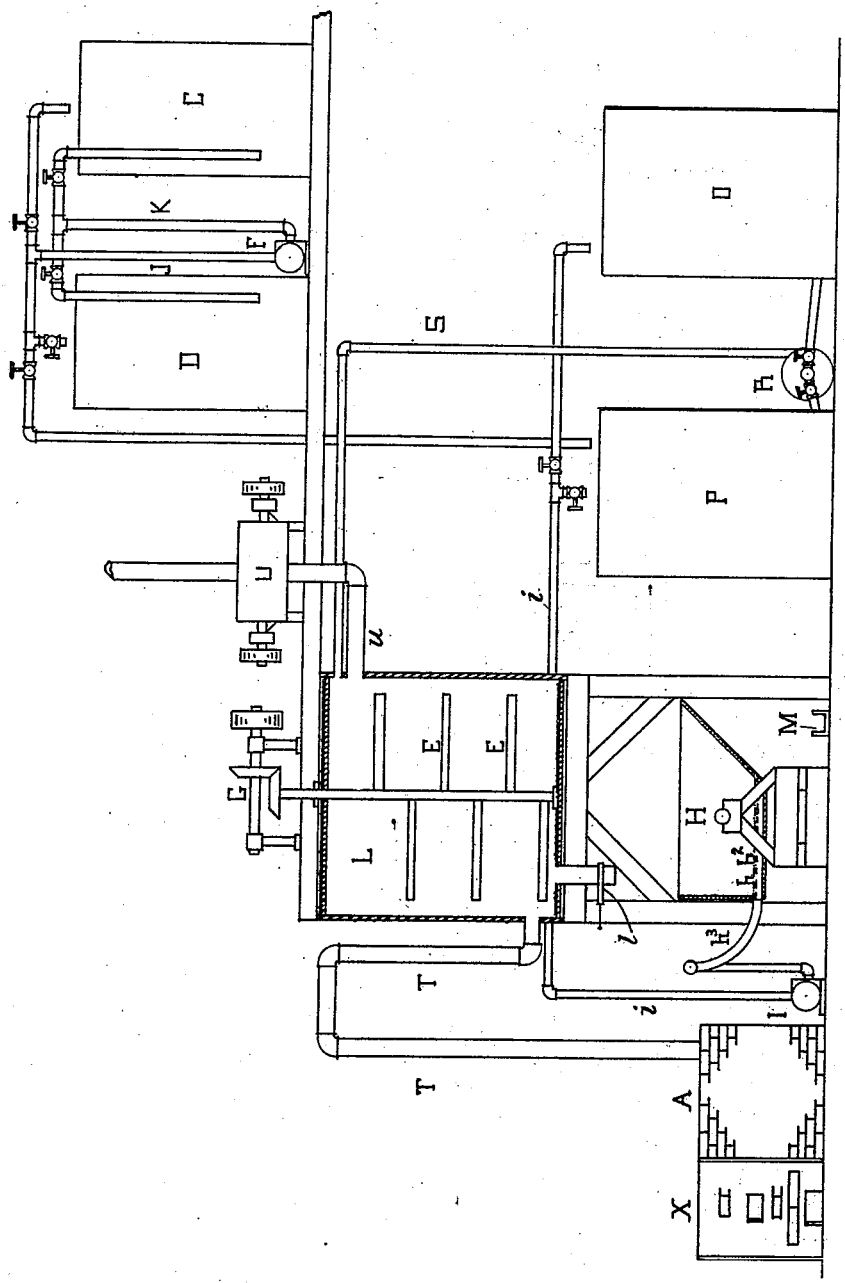
WITNESSES:
George N. Gibson
O. E. Pehrson
Herbert H. Wing,
INVENTOR
BY
his ATTORNEYS

UNITED STATES PATENT OFFICE.

HERBERT H. WING, OF NEW BRIGHTON, NEW YORK.

PROCESS OF MAKING MAGNESIUM SULFITE.

SPECIFICATION forming part of Letters Patent No. 690,503, dated January 7, 1902.

Application filed May 13, 1901. Serial No. 59,903. (No specimens.)

*To all whom it may concern:*

Be it known that I, HERBERT H. WING, a citizen of the United States, residing at 61 Tyson street, New Brighton, in the county of Richmond and State of New York, have invented certain new and useful Improvements in Processes of Obtaining Sulfite Compounds and By-Products; and I do hereby declare the following to be a full, clear, and exact description of the invention, such as will enable others skilled in the art to which it appertains to make and use the same.

The object of my invention is to utilize sulfur fumes in the production of chemicals in the place of other and more expensive chemicals which have hitherto always been used in the commercial production of such chemicals. I am also able to use sulfur fumes which are too dilute for any other known purpose.

When sulfur fumes are used for the production of the bisulfite liquors which are used in the manufacture of chemical fiber in paper-mills, it is desirable that the percentage of sulfur dioxid in the fumes be high as possible, so that as much as possible of the lime and magnesia used to make the bisulfite solutions will be converted into sulfites and as small an amount of sulfate produced as possible, as all the sulfate produced consumes sulfur and lime by the final production of calcium sulfate, which after saturating the bisulfite solution precipitates from the same, and thus causes loss and trouble to remove. In the production of the chemicals which are the subject of this application I use only magnesium compounds in the first step for fixing the sulfur fumes and am thus able to utilize the soluble sulfate which can be separated from the impurities which are generally present in the raw materials used. Gases containing only the higher percentages of sulfur dioxid are commercially used for the production of bisulfite solutions, for the reason that when smaller percentages of sulfur dioxid exist in the gases there is generally more oxygen present in proportion to the sulfur dioxid, and the sulfites are easily converted into sulfates by exposure to oxygen, and the greater the exposure the greater the production of sulfates. When the gases are dilute, they also frequently contain some sulfuric-acid gas, so that the objectionable production of sulfates by their use is thus increased in two ways.

By means of my process I am able to make use of the sulfur fumes where it remains a necessity to produce them and where they often thereby become a great nuisance and where it would not be commercially possible to erect paper-mills or acid-works to utilize them.

The dilute fumes (less than one per cent. $SO_2$) which I have used could not be applied for the manufacture of liquid sulfurous acid by absorbing them in water and then expelling the pure gas by heat, as such dilute gases will not produce strong enough sulfurous-acid solutions to be of use commercially. By my process I can also use sulfur fumes which are contaminated with air or with air and carbonic-acid gas. Besides using sulfur fumes which are a waste product and often a nuisance, the chemicals which I produce from them are at present produced by expensive chemicals, such as sulfuric acid or sodium sulfate and calcium chlorid, carbonate of magnesia and sulfuric acid, &c.

My process, in general terms, consists in first producing a mixture of the sulfite and sulfate of magnesium by bringing the sulfur fumes and air in contact (in the presence of moisture) with magnesia, magnesium hydrate, carbonate, or any compound of magnesium which is decomposable by sulfur dioxid in the presence of moisture. The sulfite, which is insoluble, is then separated from the solution containing the sulfate, and the sulfate may be crystallized out from the solution and is then in marketable condition and is known as "epsom salts." The sulfite can be used as the first step in an improved process for making bisulfite liquors, which forms the subject-matter of another application. Instead of having the sulfite and sulfate or only the sulfate of magnesia as the sole products or product of the utilization of the sulfur fumes, which necessitates the purchase of all of the magnesium in some form decomposable by sulfur dioxid in the presence of moisture, the cost of this item can be reduced by carrying out the following reactions: The sulfate of magnesium is brought into contact with a solution of calcium chlorid, whereby there are produced calcium sulfate and magnesium chlorid according to the reaction

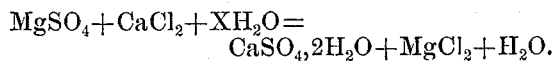

The calcium sulfate being practically insoluble is precipitated, filtered, and washed and preferably dried, in which condition it is known as "crown-filler" or "pearl-hardening." To the solution of magnesium chlorid I add lime or milk of lime, whereby there are produced magnesium hydrate and calcium chlorid. The magnesium hydrate being insoluble is precipitated. The liquor containing the calcium chlorid can then be decanted. The magnesium hydrate thus produced can be used over again in the first step of the process, and the regenerated calcium chlorid can also be used over again in the fourth step of this process. Instead of using lime containing only the calcium oxid, as above mentioned, I can use lime obtained from dolomite, and therefore containing both calcium and magnesium oxids. When this kind of lime is used, more will be required, as only the calcium hydrate from the same acts on the magnesium chlorid; but the magnesium hydrate from it will be obtained as such along with the magnesium hydrate from the magnesium chlorid, so that as much magnesium hydrate is obtained as a by-product as is contained in the dolomite lime. Wherever lime or dolomite lime is to be used, it may be used either in the form of lime or as milk of lime, as may be preferred, the milk of lime being in all respects equivalent to the lime in the reactions herein described. As the magnesium hydrate which is thus obtained is more valuable than calcined magnesia or carbonate of magnesia at certain localities, the latter forms of magnesia may be used instead of the former for the first step of this process, in which case the final products will be all the magnesia of the calcined magnesia or carbonate of magnesia and that of the dolomite lime and also the crown-filler or pearl-hardening, while the only products which require to be purchased are calcined magnesia or carbonate of magnesia and ordinary dolomite lime.

To carry out my process of utilizing sulfur fumes, a variety of different forms of apparatus may be used.

In the annexed drawing, which is an elevation, partly in section, I have shown a form of apparatus which is adapted for such work.

X represents a source from which fumes containing sulfur dioxid may be obtained and may be a smelting-furnace, ore-roaster, or any apparatus from which fumes containing sulfur dioxid can be obtained.

A represents a dust-collecting chamber for settling out any dust carried by the fumes.

T T represent pipes which convey the fumes to the absorbing apparatus L, which consists of a tank, with means E for agitating the contents, and G represents mechanism for operating the agitators E.

H represents a receiving-tank preferably mounted on trunnions and which is provided with a perforated false bottom $h$ and filtering material $h^2$. This tank is connected with suitable flexible connections $h^3$ to a pump I, whereby the liquid contents of tank H may be drained away from the solid matter, leaving the latter semidry.

M represents a trough or conveyer into which the drained contents of tank H may be emptied, as by tipping the same, and by which the same contents may be conducted to any other desired apparatus—as, for instance, to a drier.

O represents a tank for crystallizing the magnesium sulfate, and P a tank for preparing the milk of magnesia or any other compound of magnesium which in the presence of moisture is decomposable by sulfur dioxid.

R represents a pump for forcing the magnesium emulsion into the absorbing apparatus L.

S is the pipe connecting the pump R with the absorbing apparatus L.

D and C are tanks for treating the magnesium sulfate and the magnesium chlorid.

F is a pump, and K and J are inlet and outlet to said pump, by means of which the liquid contents of C and D may be transferred from one to the other or to the tank P.

The method of operating the apparatus shown in the drawings consists in first passing the sulfur fumes containing $SO_2$, with some air and more or less of $SO_3$, (from X,) through the dust-settling chamber A. They are then drawn through the absorbing apparatus L, through pipe $u$, by means of the suction maintained by the suction-blower U. The absorbing apparatus L is nearly filled with an emulsion of magnesium hydrate or of any compound of magnesium which in the presence of moisture is decomposable by sulfur dioxid and is prepared in the tank P and delivered to the absorber by the pump R through the pipe S. The emulsion is kept agitated by means of the agitators E E and mechanism G, which is continuously operated. By passing the sulfur fumes into the emulsion of magnesium hydrate or any other compound of magnesium which in the presence of moisture is decomposable by sulfur dioxid the monosufite and sulfate of magnesium are produced and the monosulfite, being insoluble, is precipitated. This operation is continued until all the magnesia is converted into the monosulfite and sulfate, which can be ascertained by testing the liquors for acid or alkali reaction. The valve $l$ in the discharge-pipe of tank L is then opened and the contents of the absorber are discharged into the filter-tank H. The monosulfite of magnesium being insoluble is in the form of a whitish granular mud, from which a part of the water is drained by drawing it through the filter and perforated bottom of the tank H by the pump I, leaving a semidry mass in the tank. The monosulfite of magnesium is removed from the tank H and may be shipped at once, but is preferably further dried. The solution passing through the filter in H is forced by the pump I through pipe $i$ into the tank O, where it is allowed to remain, and the magnesium sulfate in solution is crystallized out. The mother-liquors from same can be used to make up the emulsions in P until they are used so often as to contain too great an amount of impurities, when fresh water is used in place of the impure mother-liquors, which are thrown away. The crystallized magnesium sulfate obtained by the above method is then added to a solution of calcium chlorid contained in the tank D, whereby calcium sulfate ($CaSO_4 2H_2O$) and a solution of magnesium chlorid ($MgCl_2$) are produced. As before described, the insoluble calcium sulfate is washed and preferably dried, in which condition it is known in the market as "crown-filler" or "pearl-hardening." The solution of the magnesium chlorid which is thus produced is forced by the pump F into the tank C. In this solution lime or, as an equivalent, milk of lime is added, whereby calcium chlorid is regenerated, which can be used over again, and magnesium hydrate is produced, which, being insoluble, is precipitated. The calcium-chlorid solution is pumped back into the tank D. The magnesium hydrate is then pumped to the tank P, from which it is forced into the absorber to be used over again, or it is washed and dried or made into carbonate and dried or used to make any of the marketable forms in which magnesia is found.

Instead of using lime containing only calcium oxid in the tank C dolomite lime or milk of lime can be used, which, as before mentioned, requires more lime; but the magnesium which it contains forms the hydrate when slaked and increases the total amount of magnesium hydrate precipitated in that tank.

What I claim is—

1. The herein-described process of producing magnesium sulfite and a by-product which consists in subjecting any compound of magnesium decomposable by sulfur dioxid in the presence of moisture, to the action of fumes containing sulfur dioxid and air, whereby the sulfite and sulfate of magnesium are produced, then separating the insoluble magnesium sulfite from the liquor in which it was produced, and then crystallizing the magnesium sulfate from said liquor.

2. The herein-described process of producing magnesium sulfite and a by-product which consists in subjecting any compound of magnesium decomposable by sulfur dioxid in the presence of moisture, to the action of fumes containing sulfur dioxid and air, whereby the sulfite and sulfate of magnesium are produced, then separating the insoluble magnesium sulfite from the liquor in which it was produced, then adding calcium chlorid to the magnesium sulfate whereby magnesium chlorid and calcium sulfate are produced, then separating the insoluble by-product calcium sulfate from the liquor in which it was produced, then adding calcium hydrate to the magnesium chlorid which remained in solution in said liquor whereby magnesium hydrate and calcium chlorid are produced.

3. The herein-described process of producing magnesium sulfite and two by-products which consists in subjecting any compound of magnesium decomposable by sulfur dioxid in the presence of moisture, to the action of fumes containing sulfur dioxid and air whereby the sulfite and sulfate of magnesium are produced, then separating the insoluble magnesium sulfite from the liquor in which it was produced, then adding calcium chlorid to the magnesium sulfate whereby magnesium chlorid and the by-product, calcium sulfate, are produced, then separating the insoluble calcium sulfate from the liquor in which it was produced, then adding calcium hydrate to the magnesium chlorid which remained in solution in said liquor whereby calcium chlorid and the by-product, magnesium hydrate, are produced, then separating the insoluble magnesium hydrate from the liquor in which it was produced.

4. The herein-described process of producing magnesium sulfite and two by-products which consists in subjecting any compound of magnesium decomposable by sulfur dioxid in the presence of moisture, to the action of fumes containing sulfur dioxid and air, whereby the sulfite and sulfate of magnesium are produced, then separating the insoluble magnesium sulfite from the liquor in which it was produced, then adding calcium chlorid to the magnesium sulfate whereby magnesium chlorid and a by-product, calcium sulfate are produced, then separating the insoluble calcium sulfate from the liquor in which it was produced, then adding dolomite lime to the magnesium chlorid which remained in solution, whereby calcium chlorid and the by-product magnesium hydrate are produced, then separating the insoluble magnesium hydrate from the liquor in which it was produced.

5. The herein-described process of producing magnesium sulfite and by-products which consists in subjecting magnesium hydrate to the action of fumes containing sulfur dioxid and air, whereby the sulfite and sulfate of magnesium are produced, then separating the insoluble magnesium sulfite from the liquor in which it was produced, then adding calcium chlorid to the magnesium sulfate whereby magnesium chlorid and the by-product calcium sulfate are produced, then separating the insoluble calcium sulfate from the liquor in which it was produced, then adding dolomite lime to the magnesium chlorid which remained in solution in said liquor, whereby calcium chlorid and the by-product, magnesium hydrate are produced, then separating the insoluble magnesium hydrate from the liquor in which it was produced.

In testimony whereof I hereto affix my signature in presence of two witnesses.

HERBERT H. WING.

Witnesses:
AUGUSTUS ACKER,
JOHN J. SULLIVAN.